(12) United States Patent
Ben-Dvora et al.

(10) Patent No.: US 9,356,876 B1
(45) Date of Patent: May 31, 2016

(54) SYSTEM AND METHOD FOR CLASSIFYING AND MANAGING APPLICATIONS OVER COMPRESSED OR ENCRYPTED TRAFFIC

(71) Applicant: Cisco Technology, Inc., San Jose, CA (US)

(72) Inventors: Nir Ben-Dvora, Herzliya (IL); Michael Zayats, Sunnyvale, CA (US); Chanoh Haim, Tel-Mond (IL); Ranjana Rao, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 144 days.

(21) Appl. No.: 14/088,436

(22) Filed: Nov. 24, 2013

(51) Int. Cl.
*H04L 12/851* (2013.01)

(52) U.S. Cl.
CPC .................................. *H04L 47/2441* (2013.01)

(58) Field of Classification Search
CPC ............................ H04L 47/10; H04L 47/2441
See application file for complete search history.

(56) References Cited

U.S. PATENT DOCUMENTS

| 2009/0109849 A1* | 4/2009 | Wood ...................... H04L 47/10 370/235 |
| 2013/0107872 A1* | 5/2013 | Lovett ..................... H04L 49/10 370/352 |
| 2013/0294449 A1* | 11/2013 | Kim ....................... H04L 43/026 370/392 |
| 2014/0160932 A1* | 6/2014 | Venkatachalam Jayaraman .............. H04L 69/04 370/235 |

* cited by examiner

*Primary Examiner* — Brandon Renner
*Assistant Examiner* — Voster Preval
(74) *Attorney, Agent, or Firm* — Meunier Carlin & Curfman LLC

(57) ABSTRACT

System and methods for identifying and managing applications over compressed or encrypted traffic in a network are described. The first and second embodiments, which provides a method for managing applications over compressed or encrypted traffic respectively, comprise identifying applications on the traffic, saving the application classification per connection, and propagating the application classification to the network. A method for providing application identification over compressed or encrypted traffic is also disclosed, which includes an application recognition module configured to, among other functions, determine an application classifier for compressed or encrypted traffic without applying an application classification process, and utilize the application classification for previous packets originating from the connection for the current packets from the same connection.

16 Claims, 9 Drawing Sheets

SYSTEM AND METHOD FOR CLASSIFYING AND MANAGING APPLICATIONS OVER COMPRESSED OR ENCRYPTED TRAFFIC

BACKGROUND

In today's computer networks, users are utilizing more applications than ever before, and networks utilize application classification technologies to identify precisely which applications are running on the network in order to manage them more effectively. Due to the exponential increase of traffic volume in the network, network compression and optimization techniques were highly adopted. Similar to the network bandwidth growth, cyber-threats has been exponentially growing. Many companies cite cyber threats as the top risk to their operations-higher than even the threat from natural disasters. As a result, encryption of data in computer networks has become critical.

Due to these two problems, many companies are currently using compression, optimization and encryption techniques. However, application classification, and other functions associated with classified applications, conflict with, and are complicated by, the technologies used in wide area networks to compress or encrypt or optimize traffic. Thus, there is a need in the art for a method for classifying and managing applications over compressed or encrypted traffic in a network, including without limitation, a WAN network.

SUMMARY

Broadly described, the various embodiments of invention provide for a system and methods for providing application identification and management of applications in a network which includes compressed or optimized traffic ("compressed traffic"). In some embodiments, these same methods and systems may be utilized for application classification over encrypted traffic instead of compressed traffic. In a first embodiment, a method, and associated system, of classifying applications over compressed interfaces comprises the steps of: receiving uncompressed traffic including application data from a connection; determining an application classifier for application data; saving the application classifier for the connection; classifying any consecutive packets from the connection with the same application classifier; and propagating the application classifier to the compressed interfaces. A second embodiment provides a method, and associated system, for classifying applications over encrypted interfaces instead of compressed interfaces as in the first embodiment.

In the third embodiment, a method, and associated system, for managing applications over compressed interfaces comprises the steps of detecting compressed traffic originating from a first connection; acquiring the application classifier for the compressed traffic; and, executing an application management process on the compressed traffic; and, returning an application management process output to the network. The fourth embodiment provides a method, and associated system, for managing applications over encrypted interfaces instead of compressed interfaces as in the third embodiment.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF DRAWINGS

Like reference numbers and designations in the various drawings indicate like elements.

DETAILED DESCRIPTION

Figure 1:
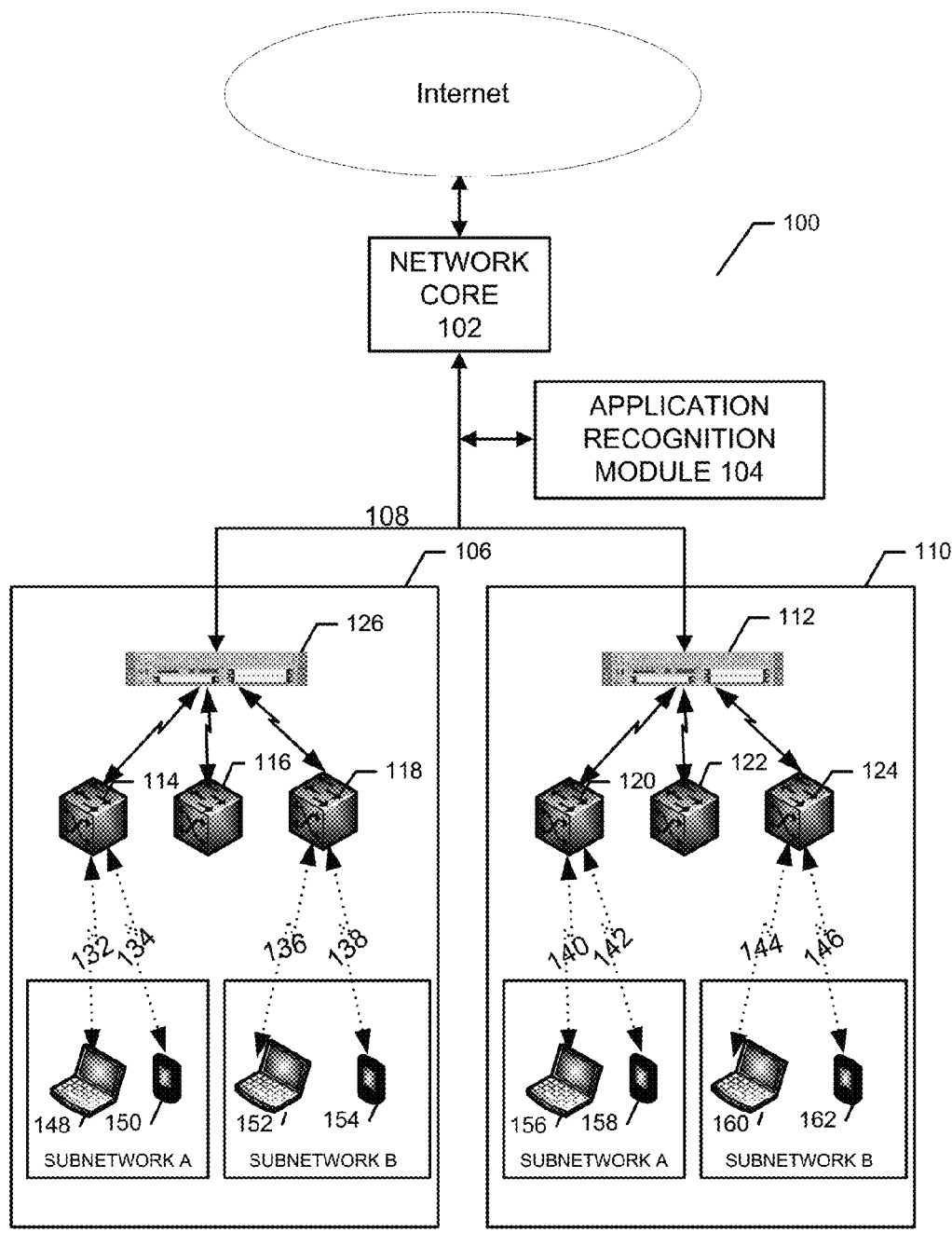
FIG. 1 is a block diagram of a system according to the various embodiments of the invention.

FIG. 1 is a block diagram of a system according to the various embodiments of the invention. Network 100 is a wide area network comprising a network core 102, which may include one or more routers serving as the backbone of network 100. Network core 102 comprises equipment to provide paths for the exchange of information between a plurality of subnetworks (106 and 110). Each subnetwork includes a router (126 and 112, respectively), which may be coupled to one or more switches (114-124). Those skilled in the art will appreciate that various types and quantities of equipment and structure may be included in the network core and each subnetwork network within the spirit and scope of this invention.

To optimize bandwidth in network 100, one or more devices may compress traffic in the network 100 (data compression devices). These devices may comprise, without limitation, a router such as routers 126 and 112. For purposes of illustration, the routers 126 and 112 will be described as comprising the data compression devices in network 100 although other devices in network 100, such as the switches 114-124 may also serve as data compression devices.

The data compression devices 126 and 112 comprise compression software to compress traffic, which includes one or more packets, from the respective subnetwork. The compression software optimizes traffic from each subnetwork (106 or 110) in the network 100. This compression software (shown as "Compression Software" 905) may be stored in a storage system 904, as will be described further in FIG. 9. In network 100, wherein the routers 126 and 112 are serving as the data compression devices, the connection point between each router 126 and 112 in network 100, and the network core 102 is referred to as a "compression interface". Each compression interface includes a connection for transmitting compressed data from one or more end user devices 148-162 in the respective subnetwork to the network.

To safeguard communications in subnetwork networks 106 and 110, one or more devices may encrypt traffic in network 100 (data encryption devices). As with the data compression devices, these devices may comprise, without limitation, a router such as routers 126 and 112. For purposes of illustration, the routers 126 and 112 will be described as comprising the data encryption devices in network 100 although other devices in network 100, such as the switches 114-124 may also serve as data encryption devices. These data encryption devices may include encryption software (shown as 907 in FIG. 9) for encrypting traffic in network 100.

System 100 further includes one or more end user devices 148-162, wherein each end user device is communicatively coupled to a switch 114-124 (depending on the location of the end user device). The connection between the end user devices 148-162 and switches 114-124 may comprise, without limitation, a WIFI connection or Ethernet connection. End user devices 148-162 in system 100 may utilize one or more applications, such as a Facebook application or a YouTube application, which may generate a plurality of application flows or packets (hereinafter referred to as "traffic" or "packets").

Application recognition module (ARM) 104 may comprise a computer device (as described in FIG. 9) configured to perform various functions on compressed or encrypted traffic on network communication interface 108. These various functions may involve reporting or quality of service functions relating to the type of application(s) being utilized in the network. This application recognition module may include any type of software developed for analyzing applications in a network environment, including without limitation, the CISCO® Application Visibility and Control (AVC) Solution. The application recognition module (ARM) is configured to utilize the application classifier for the connection which originates the compressed or encrypted traffic, rather than trying to execute application classification methods on the compressed or encrypted traffic. The ARM is described in greater detail in the description of FIGS. 7 and 8.

Figure 2:
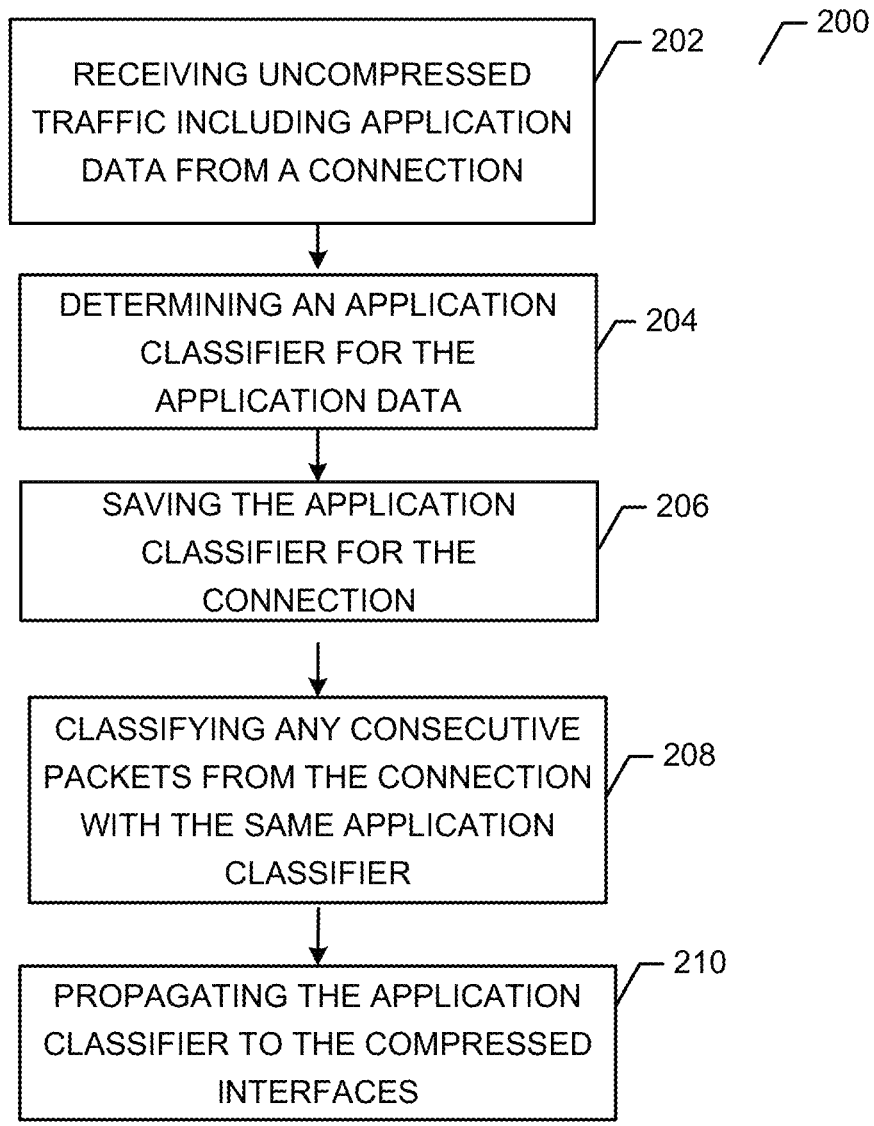
FIG. 2 is a flow diagram illustrating the application classification method of the first embodiment of the invention.

FIG. 2 is a flow diagram illustrating the application classification method of the second embodiment of the invention. Method 200 could be executed by any computer device operating in the uncompressed interface of network 100, including without limitation a router tasked with traffic compression shown as router 126 or 112 in FIG. 1. Alternatively, another router or switch, such as switches 114-124, could also execute method 200 within the spirit and scope of the invention.

Method 200 begins at step 202, and receives uncompressed traffic including application data for a connection in the sub-network 106 or 110. The application data may comprise any information that would help identify the application, including without limitation, application name, size, path, run time information, code sections, source IP address, destination IP address, ports or protocols. The application data could also comprise the name, version, or producing company of the application.

At step 204, method 200 determines an application classifier for the application data. This step 204 involves utilizing techniques used in application recognition modules, such as but without limitation, the Cisco® Application Visibility and Control technology, to identify which application is originating the packets based on the application data. This step 204 may also involve utilizing a cloud-based application classification service which is communicatively coupled to network 100. The cloud-based application classification service may receive the application data, and after processing the application data, return an application classifier based on the cloud-based application classification service's algorithms and databases.

Figure 9:
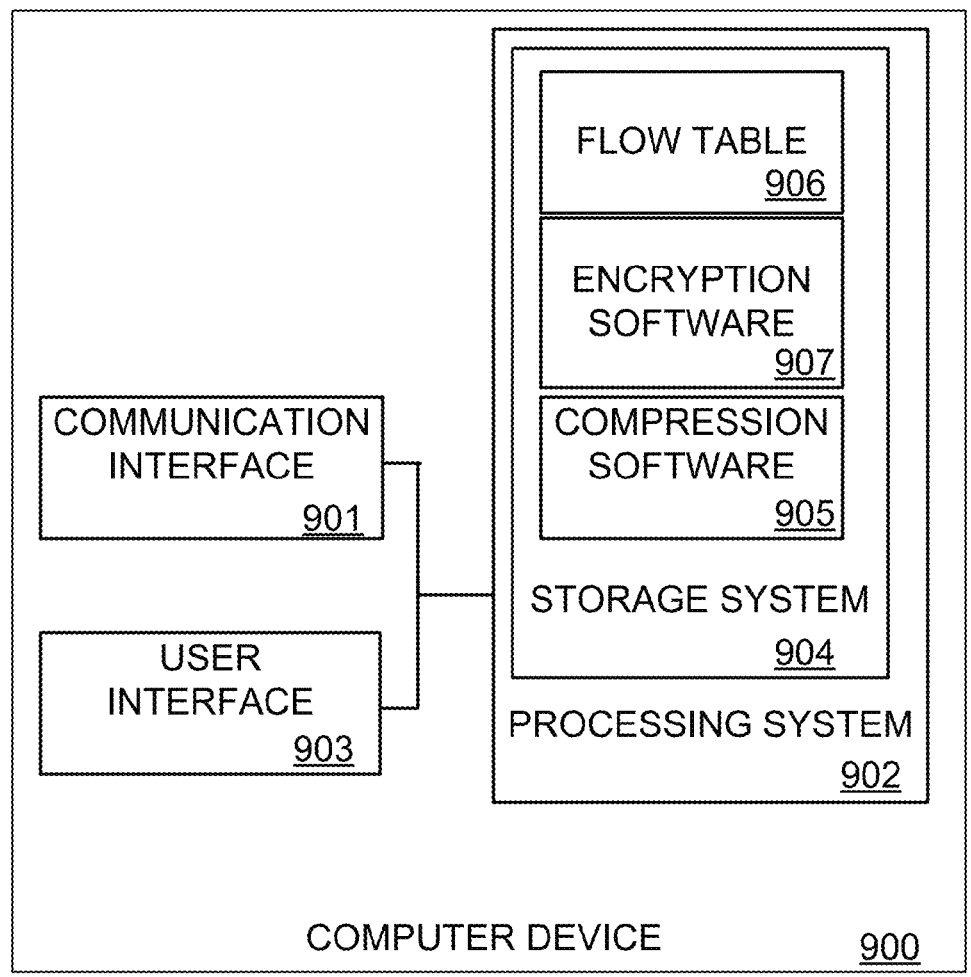
FIG. 9 is a block diagram illustrating a computer device in accordance with the various embodiments of the invention.

At step 206, method 200 saves the application classifier for the connection. The application classifier and any related L7 information, such as sub-classification information, is saved per connection. If an end user device is originating the uncompressed traffic, then the application classifier would be stored in the routers (126 or 112 in FIG. 1) or switches (114-124 in FIG. 1) in network 100. However, this application classifier may be saved in any memory accessible by, or included in, network 100. For example, a router (such as router 126 or 112 in FIG. 1, with components as shown in FIG. 9) may store the application identifier in the storage system 904.

At step 208, method 200 classifies any subsequent packets from the same connection with the same application identifier saved at step 206. In an alternate embodiment, if an application identifier was not saved for the packets at step 206, and an application classifier was previously stored at the same connection for previous packets, method 200 would involve the classification of the packets with the previously saved application identifier at step 208.

At step 210, method 200 propagates the application classifier to the interfaces in the network 100. This propagation step could involve any number of processes. For example, the propagation step could include referencing a flow table which is stored on the data compression device, which as previously described, is computer device in network 100 that is executing the traffic compression (such as router 126 or 112, or any of switches 114-124). This flow table could include the network locations to which the application classifier should be communicated within network 100.

Figure 3:
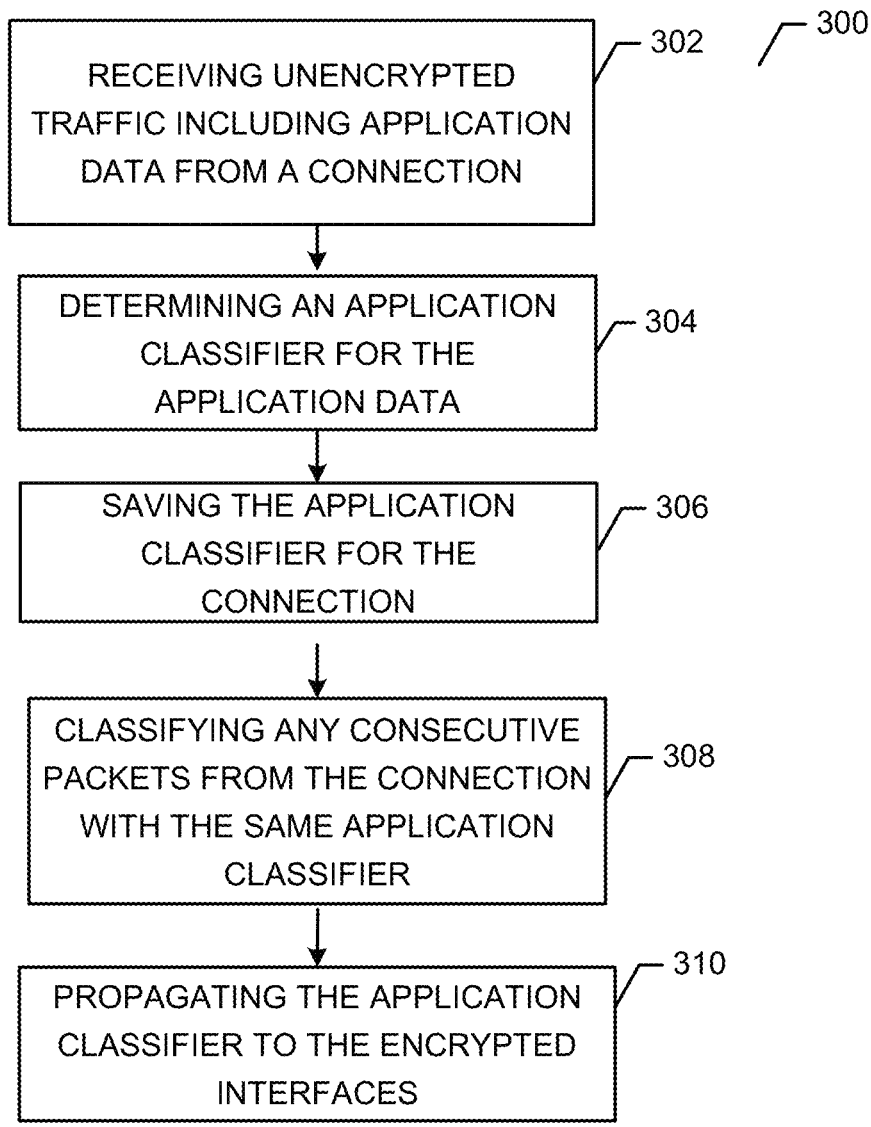
FIG. 3 is a flow diagram illustrating the application classification method of the second embodiment of the invention.

FIG. 3 illustrates the method of the second embodiment of the invention, which comprises a method of classifying applications over encrypted traffic instead of compressed traffic as in the first embodiment. Thus, method 300 involves the same steps and processes as described in FIG. 2 for the first embodiment, except that encrypted traffic is received at step 302, and the application classification is performed on unencrypted traffic. Further, the application classifier is propagated to encrypted interfaces instead of compressed interfaces at step 310. Similar to compression interfaces, encrypted interfaces comprise any connection in network 100 wherein traffic is being encrypted via encryption software.

Figure 4:
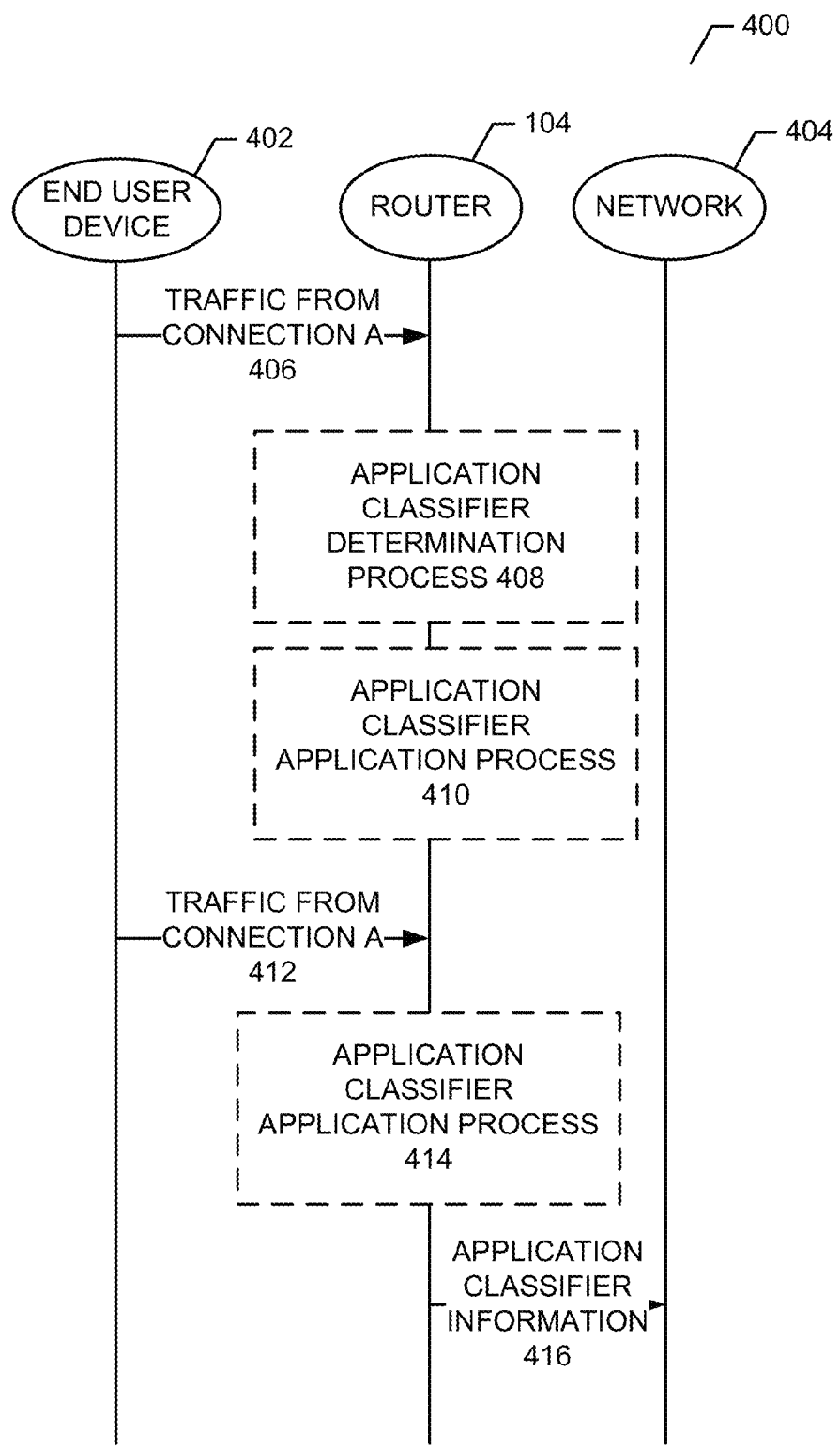
FIG. 4 is a signaling diagram illustrating the method of the first and second embodiments of the invention.

FIG. 4 is a signaling diagram illustrating the signals exchanged between the network devices during execution of the method of the second embodiment of the invention. In signaling diagram 400, end user device 402 outputs traffic from a connection on the end user device (here, referred to as "Connection A" for exemplary purposes only), shown as signal 406, to router 104. In the first embodiment, this traffic 406 comprises compressed traffic. In the second embodiment, the traffic 406 comprises encrypted traffic. Connection A may comprise any standard connector between an end user device and a network such as a WAN network. Once router 104 receives the traffic 406, in both the first and second embodiments, router performs two processes: an application classifier determination process 408 and an application classifier application process 410.

The application classifier determination process 408 involves analysis of the application data to determine the application that "fits" the application data. This process may involve utilizing a cloud-based traffic classification service which receives the application data, and returns the application classifier as output. The application classifier determination process could also involve the router 104 referencing a database of application classifiers, with associated characteristic information, and selecting the application classifier with the closest match to the application data. Those skilled in the art will appreciate that any number of methods could be utilized to select the application classifier within the various embodiments of the invention.

Application classification aims to determine the application used for any connection and is based on several different methods or even a combination of methods. Such methods may comprise L2 (Layer 2) protocols such as ARP (Address Resolution Protocol); PPP (Point-to-Point Protocol); LLDP (Link Layer Discovery Protocol). The methods may also comprise IP protocols (such as ICMP (Internet Control Message Protocol); IGMP (Internet Group Management Protocol); or GRE (Generic Routing Encapsulation). Other possibilities may comprise analyzing any of the following information: a) TCP or UDP ports (such as HTTP, Telnet, FTP); b) the application layer header of the application to be identified; c) Packet data content; or d) Packets and traffic behavior.

The application classifier application process 410 involves saving the application classifier for the specific connection in the end user device 402 that originated the traffic 406 in a flow table in the associated router (126 or 112 in FIG. 1) for the associated subnetwork (106 or 110 in FIG. 1). Alternatively, the application classifier may be stored in a memory in the end user device 402, such as storage 904 as shown in FIG. 9. However, the application classifier may also be stored in any memory which is accessible to network devices in network 100.

Router 104 then receives additional traffic 412, also referred to as additional packets 412, from the same connection on the same end user device as traffic 406. This traffic 412 may comprise either compressed traffic as in the first embodiment, or encrypted traffic as in the second embodiment. In both the first and second embodiments, the router then performs an application classifier application process 414 on the additional traffic to apply the same application classifier to traffic 412 as was assigned to traffic 406. Router 104 then sends the application classifier information to the network 404.

Methods 300 or 400 may be executed by a router, such as router 126 or 112 in FIG. 1. Alternatively, methods 300 or 400 may also be executed by an access device, such as WIFI access point in network 100. Those skilled in the art will recognize that any number of devices in network 100 may execute methods 300 or 400 within the spirit and scope of the invention.

Figure 5:
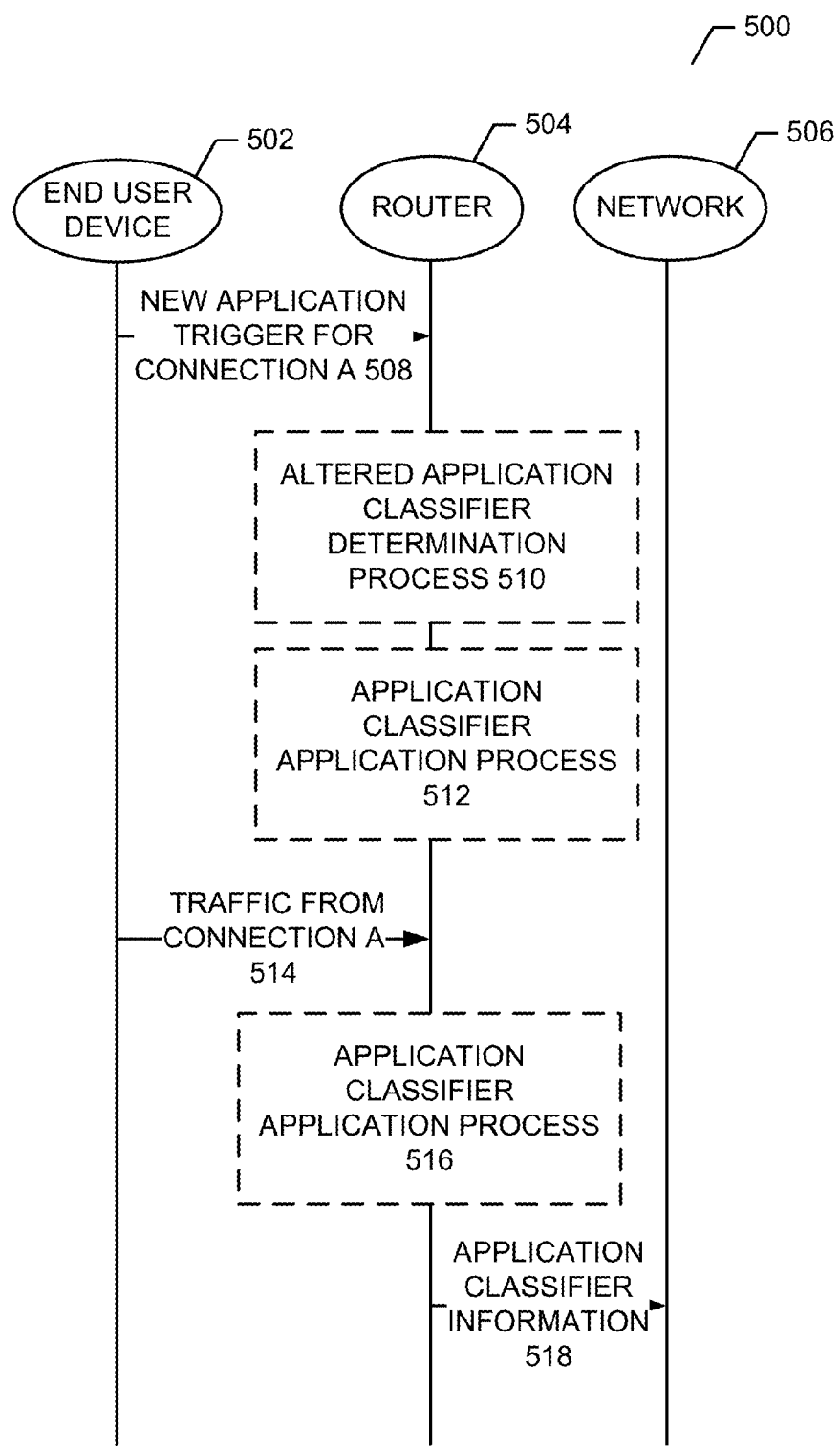
FIG. 5 is a signaling diagram illustrating the methods of the first and second embodiments of the invention when a new application is detected.

FIG. 5 is a signaling diagram illustrating the signals exchanged between the network devices in network 100 during execution of the method of the first and second embodiments of the invention. In method 500, a signal comprising a new application trigger 508 is sent from the end user device 502 to the router 504 to indicate a suspected change in application based on changed L7 application data.

Once router 504 receives the new application trigger 508, the router 504 executes two processes: an altered application classifier determination process 510 and an application classifier application process 512. The altered application classifier determination process 510 involves the same processes as the application classifier determination process 408, but for the input of altered application data instead of the application data which is input in the 408 process. The application classifier application process 512 involves the same processes as the application classifier application process 410 in FIG. 4, which comprises saving the application classifier for the specific connection in the end user device 502 that originated the traffic 508.

The end user device 502 then sends additional traffic (packets) from connection A 514, wherein this traffic comprises uncompressed traffic in the first embodiment and unencrypted traffic in the second embodiment. This additional traffic 514 is associated with the same application identifier which resulted from the altered application classifier determination process 510. To do so, the router 504 executes the application classification application process 516 to save the application identifier in connection A for the additional pack-ets. The router 504 then sends the application classifier information 518 to the network 506.

Figure 6:
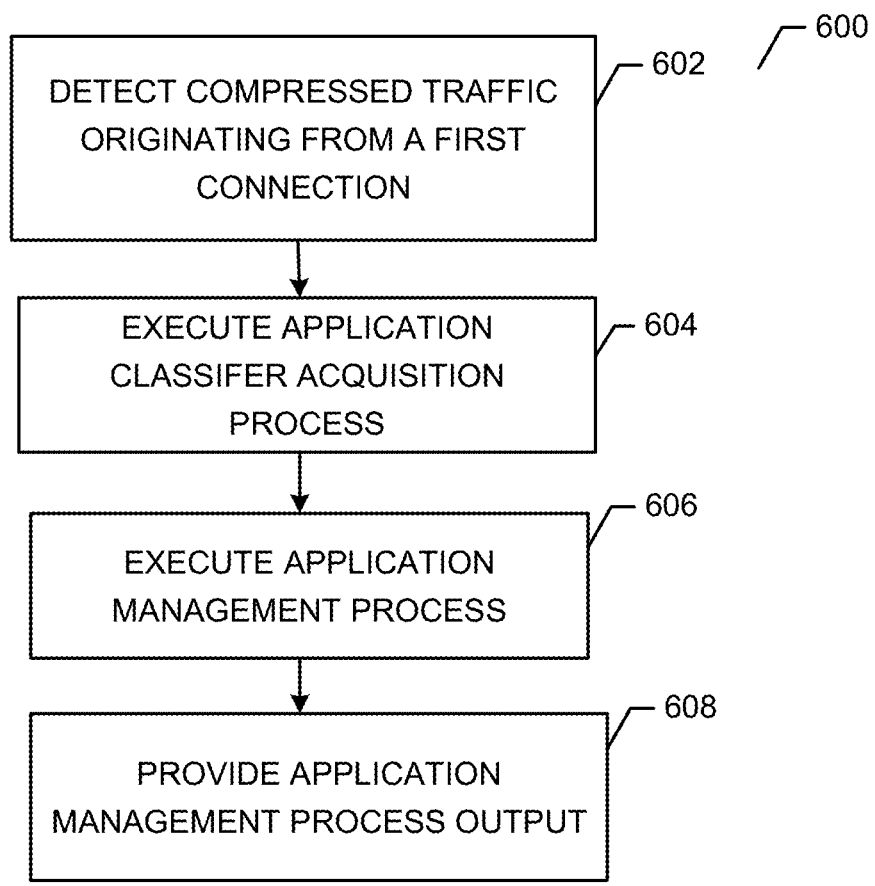
FIG. 6 is a flow diagram illustrating the application management method of the third embodiment of the invention.

FIG. 6 is a flow diagram illustrating the application management method of the third embodiment of the invention. The third embodiment may be embodied in any network device which is able to access compressed traffic (via compression interfaces) from end user devices. For example, and without limitation, the third embodiment may be embodied in the application recognition module 104, as referenced below in the description of method 600 for exemplary purposes only. Those skilled in the art will appreciate that the application recognition module 104 may comprise any number of forms within the spirit and scope of the invention. For exemplary purposes only, the application recognition module may comprise a stand-alone computer device, or a computer device which includes spread functionality among multiple locations in network 100.

Method 600 begins with step 602 when compressed traffic is detected at a first connection. This step 602 may be a passive or active step depending on the configuration of the application recognition module 104. In a passive embodiment, the application recognition module 104 would receive a notification (for example, from an end user device 148-162, or routers 126 or 112) that compressed traffic is present on communication channel 108. In an active embodiment, the application recognition module 104 would be configured to actively snoop or monitor communication channel 108 until compressed traffic is detected.

At step 604, method 600 executes an application classifier acquisition process. Instead of trying to analyze the compressed traffic to determine the application classifier, at this step the application recognition module 104 will access the connection of the network device that originated the compressed traffic to acquire the application classifier associated with the compressed traffic.

At step 606, method 600 executes an application management process, which utilizes the application classifier stored for the connection as input. This process may include any number of processes depending on the configuration of the application recognition module 104, and business needs. For example, the application management process may comprise applying quality of service metrics on traffic associated with a particular application identifier. Another example of an application management process may include a reporting function to generate a report for one or more criteria relating to the specific application represented by the application identifier. Those skilled in the art will appreciate that numerous processes involving analysis of applications, and performance of applications, in a network could be included in the application management process within the spirit and scope of the invention.

At step 608, method 600 provides application management process output. This output will vary depending on the type of application management process is utilized. If the application management process is a reporting function, then the output at step 608 may include one or more reports in any number of formats (spreadsheet, .jpg, .pdf files, etc.) If quality of service metrics are applied, the output would comprise resulting data resulting from the QoS metric application. Another example of an application management process comprises performance metrics such as delay, wherein jitter could be calculated and presented as output.

Figure 7:
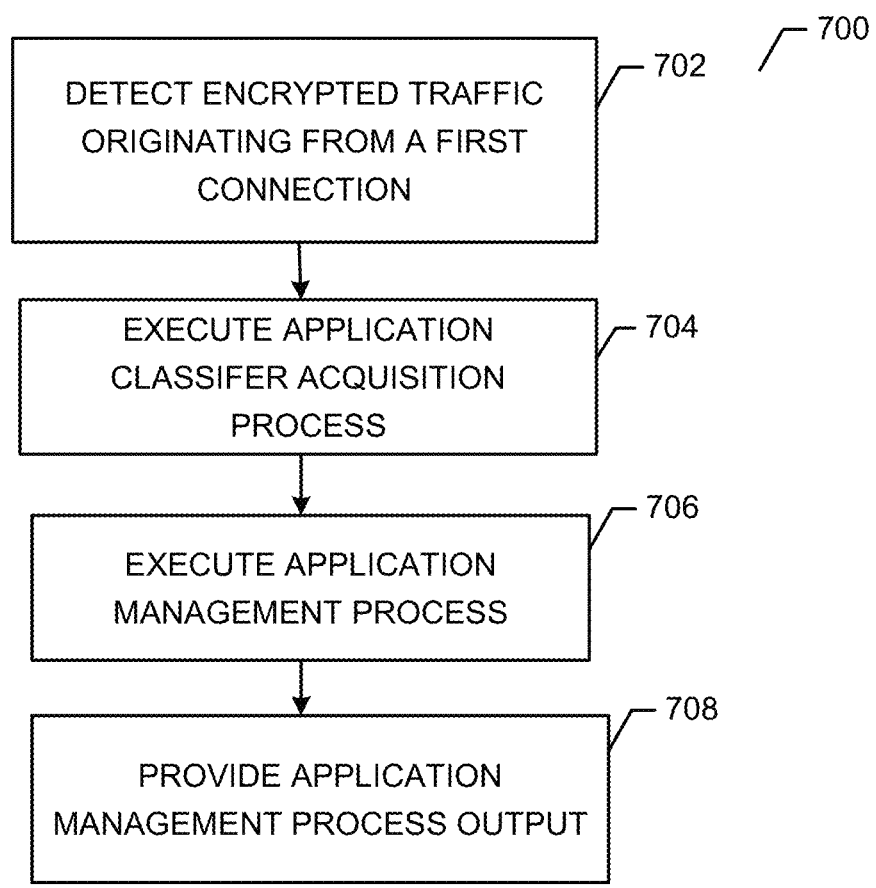
FIG. 7 is a flow diagram illustrating the application management method of the fourth embodiment of the invention.

FIG. 7 is a flow diagram illustrating the application management process of the fourth embodiment of the invention. Method 700 is similar to method 600, but for the detection of unencrypted traffic at step 702 versus the detection of uncompressed traffic at step 602. The steps 702-708 are as described for steps 602-608, except that unencrypted traffic and encrypted interfaces are involved instead of uncompressed traffic and compressed interfaces, respectively. The encrypted interfaces comprise any network connection including encryption software 907 as described below in FIG. 9.

Figure 8:
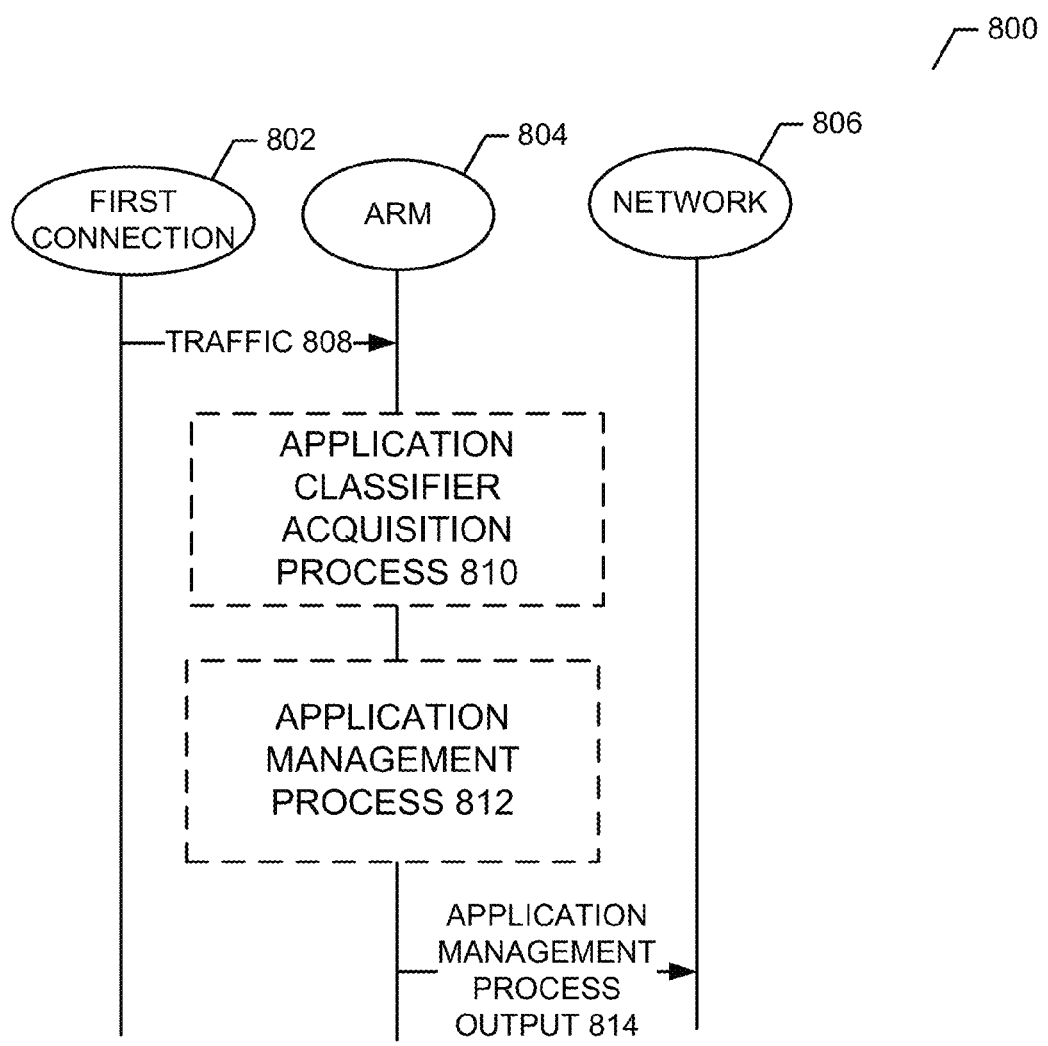
FIG. 8 is a signaling diagram illustrating the application management method of the third and fourth embodiments of the invention.

FIG. 8 is a signaling diagram illustrating the signals exchanged between network devices during execution of the application management method of the third and fourth embodiments of the invention. The first connection 802 sends traffic 808 to the application recognition module (ARM) 804. As discussed above, the third and fourth embodiments may be embodied in a number of network devices in network 100, but for exemplary purposes only, the third and fourth embodiments are described from the perspective of the application recognition module.

Traffic signal 808 may comprise uncompressed traffic in the case of the third embodiment, and unencrypted traffic in the case of the fourth embodiment. The traffic signal 808 may not be a direct signal to the ARM 804, but rather, may comprise the traffic 808 being sent to a common communication channel, such as bus 108, which the ARM 804 also has access (as described above in the passive and active embodiments).

Once ARM 804 receives traffic 808, the ARM 804 performs two processes: an application classifier acquisition process 810 and an application management process 812. As described above, the application classifier acquisition process 810 comprises the ARM 804 accessing the connection of the network device that originated the compressed traffic to acquire the application classifier associated with the compressed traffic. As also described above, the application management process 812 may comprise any number of processes depending on the configuration of the application recognition module 804, and business needs. At the conclusion of the application management process 812, the ARM 804 sends application management process output 814 to network 806.

FIG. 9 is a block diagram illustrating a network device configured to operate as described herein for identifying and managing applications over compressed or encrypted traffic in a network. This network device 900 may include, without limitation, an end user device such as 148-162 in FIG. 1. Network device 900 includes communication interface 901, processing system 902, and user interface 903. Processing system 902 includes storage system 904. Storage system 904 stores software configured to perform the methods described herein, as well as compression software 905, flow table 906, and encryption software 907.

Processing system 902 is linked to communication interface 901 and user interface 903, and may be configured to execute any of the methods described herein. In addition to an end user device, network device 900 could include a programmed general-purpose computer, although those skilled in the art will appreciate that programmable or special purpose circuitry and equipment may be used. Network device 900 may be distributed among multiple devices that together make up elements 901-907.

Communication interface 901 could include a network interface, modem, port, transceiver, or some other communication device. Communication interface 901 may be distributed among multiple communication devices. Processing system 902 could include a computer microprocessor, logic circuit, or some other processing device. Processing system 902 may be distributed among multiple processing devices. User interface 903 could include a keyboard, mouse, voice recognition interface, microphone and speakers, graphical display, touch screen, or some other type of user device. User interface 903 may be distributed among multiple user devices. Storage system 904 could include a disk, tape, integrated circuit, server, or some other memory device. Storage system 904 may be distributed among multiple memory devices.

Processing system 902 retrieves and executes compression software 905 and encryption software 907 from storage system 904. Compression software 905 and encryption software 907 may include an operating system, utilities, drivers, networking software, and other software typically loaded onto a computer system. Compression software 905 and encryption software 907 could include an application program, firmware, or some other form of machine-readable processing instructions. When executed by processing system 902, Compression software 905 and encryption software 907 directs processing system 902 to operate as described herein to classify and manage applications over compressed or encrypted traffic in a network. It is important to note that computer device 900 is not required to have both compression software 905 and encryption software 907. Thus, a computer device 900 operating some of the methods of the invention may very well comprise, or have access to, either compression software 905 or encryption software 907, but not both.

The various embodiments of the invention offer many advantages over the prior art. If networking devices can identify the specific application that originated an individual packet or flow when the traffic is uncompressed, and pass that information along to the compressed side of the network, then AVC modules will be able to perform reporting, quality of services, statistical, and other management functions with heightened accuracy. Likewise, providing this ability to classify and manage applications over encrypted traffic will also provide similar benefits. The embodiments of the invention also result in a more efficient system as the invention alleviates the need for behavioral or statistical mechanisms to identify applications in the network.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations or embodiments may also be implemented in combination in a single implementation or embodiment. Conversely, various features that are described in the context of a single implementation or embodiment may also be implemented in multiple implementations or embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Particular implementations of the subject matter described in this specification have been described. Other implementations are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous. Further, any methods described in this application may be implemented as computer software on a computer readable medium.

What is claimed is:

1. A method of identifying applications over one or more compressed interfaces in a network, wherein the network comprises at least one data compression device, the method comprising:
   receiving, at a first device, uncompressed traffic, the uncompressed traffic including application data from a second device executing an application associated with the application data, wherein the first device comprises a connection to a subnetwork of a plurality of second devices, and wherein the uncompressed traffic is received at the first device via the connection with the subnetwork;
   determining, at the first device, an application classifier, the determination at the first device being based on the application data;
   saving, at the first device, the application classifier and associated connection of the received uncompressed traffic, wherein each application classifier and associated connection are used, by a third device over one or more compressed interfaces in a network, for the identification of a source application type that generated data within the traffic flow across the one or more compressed interfaces in the network;
   causing, at the first device, the application classifier to be propagated to the third device across the one or more compressed interfaces in the network.

2. The method of claim 1, wherein application classifier and corresponding connection are propagated to the third device in a flow table.

3. The method of claim 1, wherein determining the application classifier comprises sending a portion of the received uncompressed traffic to a cloud-based application classification service, and receiving the application classifier therefrom.

4. The method of claim 1, further comprising:
   detecting, at the first device, updated L7 information from the connection with the subnetwork; and,
   sending, at the first device, an application trigger associated with the updated connection to the third device, wherein prior to the detection, any consecutive packets received at the first device from the connection are associated with the same application classifier.

5. The method of claim 4, further comprising:
   detecting, at the first device, a modified application classifier for a second uncompressed traffic;
   saving, at the first device, the modified application classifier for the connection; and,
   causing, at the first device, the modified application classifier to be propagated to the third device, wherein tile classification is applied for any consecutive packets from the connection.

6. The method of claim 1, wherein the first device comprises a router.

7. The method of claim 1, wherein the first device comprises a device selected from the group consisting of a switch and an access device.

8. A method of managing applications over compressed traffic in a network, wherein the network comprises at least one communication channel, the method comprising:
   detecting, at a first device, one or more compressed traffic from a connection, wherein the one or more compressed traffic comprises data associated with one or more applications executing on one or more second devices, the compressed traffic having been transmitted from a third device located in an uncompressed node within the network, wherein the one or more second devices are operatively linked to the third device in a subnetwork, and wherein the third device receives uncompressed traffic from the second device via a connection with the subnetwork;
   receiving, at the first device, an application classifier from the third device having stored thereon the application classifier and associated connection associated with the received uncompressed traffic, wherein the application classifier and associated connection are is-used, at the third device, for identification of a source application type that generated data within the traffic flow across the one or more compressed interfaces in the network, whereby the source application associated with the compressed traffic is ascertainable without applying a classification process to the compressed traffic;
   identifying, at the first device, the one or more application types that originated the data within the detected compressed traffic; and,
   causing, at the first device, a graphical representation of the one or more application types in a report at a display.

9. The method of claim 8, wherein detecting the compressed traffic from a connection comprises receiving, at the first device, a notification of compressed traffic present in the communication channel.

10. The method of claim 8, wherein detecting the compressed traffic from a connection comprises monitoring, at the first device, the communication channel until compressed traffic is detected.

11. The method of claim 8, wherein the received application classifier comprises a collection identifier associated with a device executing a source application that generated data within the traffic flow.

12. The method of claim 11, wherein the received application identifier is ascertained based on the connection wherein consecutive packets received at the third device from the connection are associated with the same application classifier.

13. The method of claim 8, farther comprising generating the report.

14. The method of claim 8 further comprising: executing, at the first device, a quality of service function.

15. The method of claim 8, wherein the first device comprises an application recognition module.

16. The method of claim 1, wherein the third device is configured to monitor traffic of one or more applications within compressed traffic received thereat.

* * * * *